April 20, 1943.  F. H. HEHEMANN  2,316,957

VALVE

Filed July 30, 1941

INVENTOR.
Frederick H. Hehemann
BY Oliver B. Kaiser
ATTORNEY.

Patented Apr. 20, 1943

2,316,957

UNITED STATES PATENT OFFICE 2,316,957

VALVE

Frederick H. Hehemann, Cincinnati, Ohio, assignor to The Lunkenheimer Company, Cincinnati, Ohio, a corporation of Ohio Application July 30, 1941, Serial No. 404,685

1 Claim. (Cl. 251—50)

This invention relates to improvements in globe valves of a bonnet-less character for high pressure, high temperature service, and constitutes a structure in which an insertable seat, a valve disc removably connected to the inner end of a stem, a stuffing box gland and bushing for the stem, are all contained and centralized within a single bore in the body of the valve. The bore is of stepped or counterbored form to provide annular shoulders for respectively sustaining the valve seat and stuffing box bushing.

An object of the invention is to provide a bonnet-less valve of simple and durable construction, particularly adapted for high pressure, high temperature service.

A further object of the invention is to provide a bonnet-less valve which can be readily dismantled for reconditioning the valve seating faces.

Further objects and advantages of the invention will be more fully apparent from a description of the accompanying drawing, in which.

Figure 3:
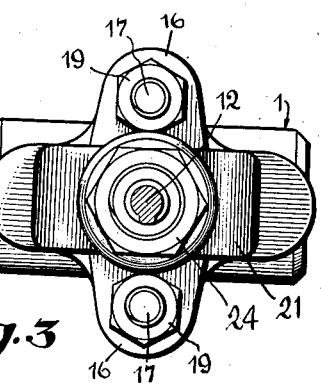
Figure 3 is a section taken on line 3—3, Figure 1.
Figure 4:
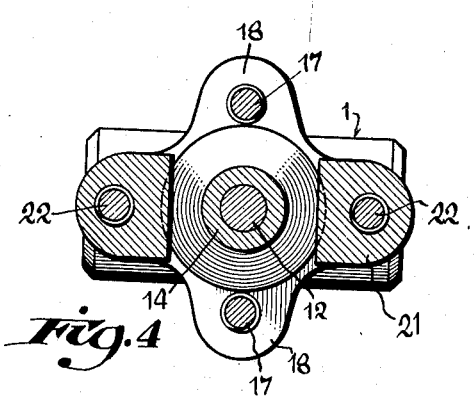
Figure 4 is a section taken on line 4—4, Figure 1.

Referring to the drawing, 1 indicates the valve body illustrated with socket welding ends 2, 2, which however may be provided with flange ends or other form of construction, depending upon the type of pipe connection to be employed. The body has a pair of ports 3, 3, therein for a passage therethrough respectively angularly disposed to relatively offset the inner ends for intervening a valve seat within the lower end of a bore 4 centrally within the body and transverse to the ports, and through which the ports are brought into communication.

The bore is of counterbore form or of differential diameter for various portions of its length to provide an annular shoulder 5 between the ports 3, 3, for sustaining a seat ring 6, and a second annular shoulder 7 for sustaining a stuffing box bushing 8 above the valve seat. The seat ring 6 has a tapering or conical seat in the upper end thereof, suitably faced to provide an appropriate wearing surface. The seat ring 6 at its lower end preferably is welded to the body, the welding 9 of fillet form, is effected through an opening in the base of the body coaxial with the bore 4. The opening, after the seat ring has been welded in place, is sealed by a plug 10 which likewise is welded to the body externally thereof.

A valve head or disc 11 is guidingly slidable within the central bore 4, replaceably connected upon the lower headed end of a valve stem 12, the replaceable connection being of conventional form for sidewise removal of the valve head when the stem and valve are withdrawn from the bore. The lower end of the valve head or disc is of conical form for cooperation with the conical seat in the ring 6, and suitably faced to provide an appropriate wearing surface. The head of the stem in seating the valve bears against a disc wearing washer 13 seated within a recess in the valve.

The stem 12 centrally extends through the stuffing box bearing 8 and a gland 14 engaged about the stem and within the upper end of the bore 4, and through a packing 15 confined between the bushing 8 and gland 14. The upper end of the gland is provided with a flange or diametrically laterally extending lugs 16, traversed by a pair of screw studs 17 secured to a flange or lugs 18, likewise extending laterally from the upper end or head of the valve body. Each stud carries a nut 19 at its upper end for depressing the gland into the bore to compress the packing 15.

The head of the valve body has a second pair of diametrically disposed laterally extending lugs 20 at right angles to the lugs 18 for supporting and securing a yoke 21 held in place by a pair of screw studs 22. The upper end of the body portion of the yoke 21 has a bearing or feed nut 23 mounted therein, through which the upper threaded end of the stem 12 traverses and in threaded engagement therewith. The head of the nut 23 contacts with the bottom side of the body portion of the yoke to hold the same against rotation.

Figure 1:
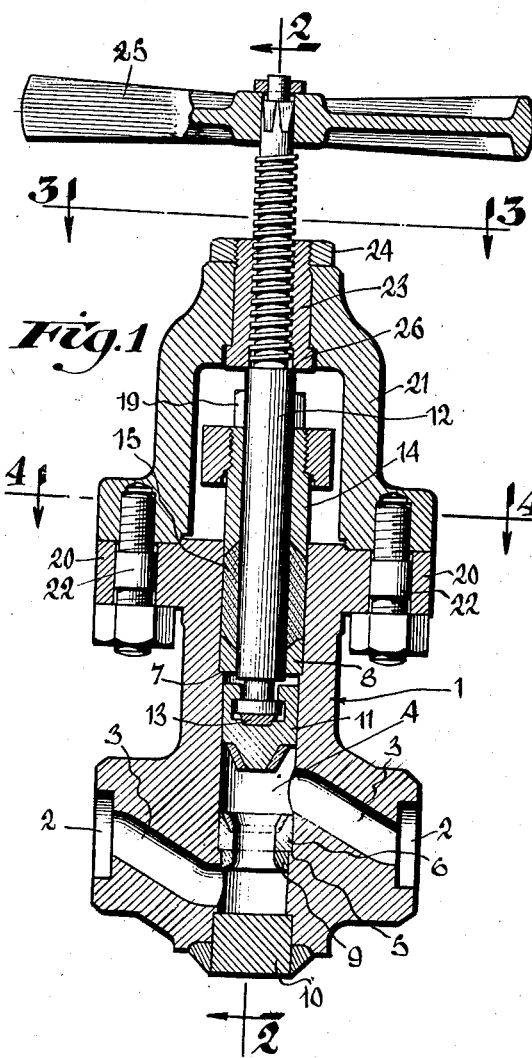
Figure 1 is a central vertical section through the valve.
Figure 2:
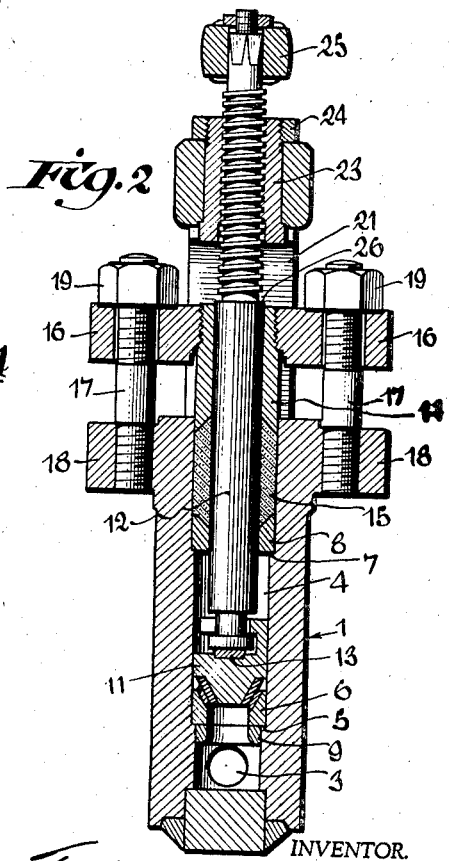
Figure 2 is a section taken on line 2—2, Figure 1.

The upper end of the feed nut has a lock nut 24 screw-threaded thereon for binding the feed nut to the yoke. The upper end of the valve stem is provided with a hand wheel 25 or other appropriate form of valve gear. The major portion of the stem is of wider diameter than the threaded portion providing a shoulder 26 at the base of the threaded portion, which serves as a stop to engage against the bottom of the body portion of the yoke when the valve is in its wide or fully opened position, as shown in Figure 1.

The valve is particularly contemplated for high pressure, high temperature service. The valve head, being guided in its control movement, and centralized with the seat ring which is fitted within the bore with the valve head, affords an accurate alignment between the valve and the seat, assuring a fluid tight joint independent of the action of the valve stem. The valve stem being guided within the stuffing box gland and bushing likewise maintained in a centralized position with the valve head and seat, and independent of the valve head and seat, does not effect any disturbing influence against maintaining the accurate alignment between the valve and seat.

The valve seat, as the valve, both being separable from the body, permits the same to be accurately machined and their cooperating surfaces interfitted before being applied in the valve body, and occupying the same bore, are centralized and aligned when disposed in the body. Likewise, their mating portions can be faced with an appropriate material, which would be difficult if the seat were an integral part of the body. The construction also permits the employment of a valve stem of reduced diameter from that of the valve disc, enabling the stuffing box to be located within the valve body instead of within a removable bonnet as conventionally practiced, which requires a packing between the body and bonnet. The seat ring being seated upon a shoulder in the body and the joint welded provides an absolutely secure seal with the welding relieved from any valve closing pressure.

Having described my invention, I claim:

A valve of the character disclosed, comprising: a body having a central counter-turned bore therethrough and lateral ports intersected by said central bore providing a passage through the body, a seat ring interposed in said central bore intervening between said lateral ports, having its underside bearing upon an annular shoulder and inwardly of the shoulder annularly consolidated with the body, a valve head guidingly movable in said central bore cooperating with the seat ring, a valve operating stem translatable within said central bore and extending therebeyond, having its end within the bore removably coupled to said valve head and screw threaded for a portion of its length extending beyond said bore, a stuffing box bushing concentric with the valve stem within the said central bore and seated against an annular shoulder, a stuffing box gland engaged within said central bore and adjustably fixed to said body, a packing within said bore about the stem and intermediate of said bushing and gland, a yoke straddling said stuffing box gland and removably fixed to said body, traversed by said valve stem and having a screw-threaded engagement therewith, the stem having an annular shoulder at the base of the threaded portion for engagement with the yoke to limit the valve unseating movement of the stem, and a plug engaged into the lower end of said central bore to seal the same and exteriorly consolidated with said valve body.

FREDERICK H. HEHEMANN.